(12) United States Patent
Liu et al.

(10) Patent No.: US 9,206,727 B2
(45) Date of Patent: Dec. 8, 2015

(54) REGENERATION DIAGNOSTIC METHODS AND SYSTEMS

(75) Inventors: Zhiping Steven Liu, Canton, MI (US); Eugene V. Gonze, Pinckney, MI (US); Janean E. Kowalkowski, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 329 days.

(21) Appl. No.: 13/304,995

(22) Filed: Nov. 28, 2011

(65) Prior Publication Data
US 2013/0138291 A1 May 30, 2013

(51) Int. Cl.
| | |
|---|---|
| *B01D 53/96* | (2006.01) |
| *F01N 11/00* | (2006.01) |
| *F01N 9/00* | (2006.01) |
| *B01D 53/92* | (2006.01) |
| *B01D 53/04* | (2006.01) |
| *B01D 53/00* | (2006.01) |
| *F02D 41/02* | (2006.01) |
| *G01M 15/10* | (2006.01) |
| *G05B 1/11* | (2006.01) |

(52) U.S. Cl.
CPC ............... *F01N 9/002* (2013.01); *B01D 53/00* (2013.01); *B01D 53/0454* (2013.01); *B01D 53/92* (2013.01); *B01D 53/96* (2013.01); *F01N 9/005* (2013.01); *F01N 11/002* (2013.01); *F02D 41/0235* (2013.01); *B01D 2259/40007* (2013.01); *G01M 15/10* (2013.01); *G05B 1/11* (2013.01); *Y02T 10/47* (2013.01)

(58) Field of Classification Search
CPC .......... G07C 5/006; G05B 1/11; B01D 53/00; B01D 53/0454; B01D 2259/40007; B01D 53/92; B01D 53/96; B01D 2258/01; B01D 2258/012; B01D 2259/40011; B01D 2259/40013; B01D 2259/40015; B01D 2259/40016; B01D 2259/40018; G01M 15/10; F02D 41/0235; F01N 11/00; F01N 11/002; F01N 11/005; F01N 11/007; F01N 2900/04; F01N 29/14; F01N 29/1404; F01N 29/1406
USPC .......... 701/29.1, 29.4, 29.9, 30.3, 31.6, 31.7, 701/31.8, 32.5, 34.4
See application file for complete search history.

(56) References Cited

U.S. PATENT DOCUMENTS

| | | | |
|---|---|---|---|
| 6,947,831 B2 * | 9/2005 | van Nieuwstadt | ............ 701/114 |
| 8,359,827 B2 | 1/2013 | Shibata et al. | |
| 8,538,661 B2 * | 9/2013 | Liu et al. | ................ 701/102 |

(Continued)

FOREIGN PATENT DOCUMENTS

| | | |
|---|---|---|
| CN | 101889131 A | 11/2010 |
| DE | 60025636 T2 | 11/2006 |

(Continued)

OTHER PUBLICATIONS

German Office Action for Application No. 10 2012 221 363.5 dated Feb. 20, 2014; 7 pages.

*Primary Examiner* — Jason Holloway
(74) *Attorney, Agent, or Firm* — Cantor Colburn LLP

(57) ABSTRACT

A method of monitoring an exhaust treatment system of a vehicle is provided. The method includes: determining a modeled resistance of exhaust flow in the exhaust treatment system; determining a measured resistance of exhaust flow in the exhaust treatment system; evaluating the modeled resistance and the measured resistance to determine a fault status; and generating at least one of a warning signal and a message based on the fault status.

12 Claims, 3 Drawing Sheets

(56) References Cited

U.S. PATENT DOCUMENTS

| | | | |
|---|---|---|---|
| 2009/0143954 A1* | 6/2009 | Leustek et al. | 701/102 |
| 2011/0314792 A1* | 12/2011 | Shibata et al. | 60/273 |
| 2011/0320103 A1* | 12/2011 | Liu et al. | 701/102 |
| 2012/0120981 A1* | 5/2012 | Genssle et al. | 374/1 |
| 2012/0186234 A1* | 7/2012 | Parnin | 60/274 |
| 2013/0269427 A1* | 10/2013 | Nagaoka et al. | 73/114.69 |

FOREIGN PATENT DOCUMENTS

| | | |
|---|---|---|
| JP | H1077826 A | 3/1998 |
| JP | 2002256846 A | 9/2002 |
| JP | 2008121631 A | 5/2008 |
| JP | 2010156241 A | 7/2010 |
| WO | 2008133694 A1 | 11/2008 |
| WO | 2010097893 A1 | 9/2010 |

* cited by examiner

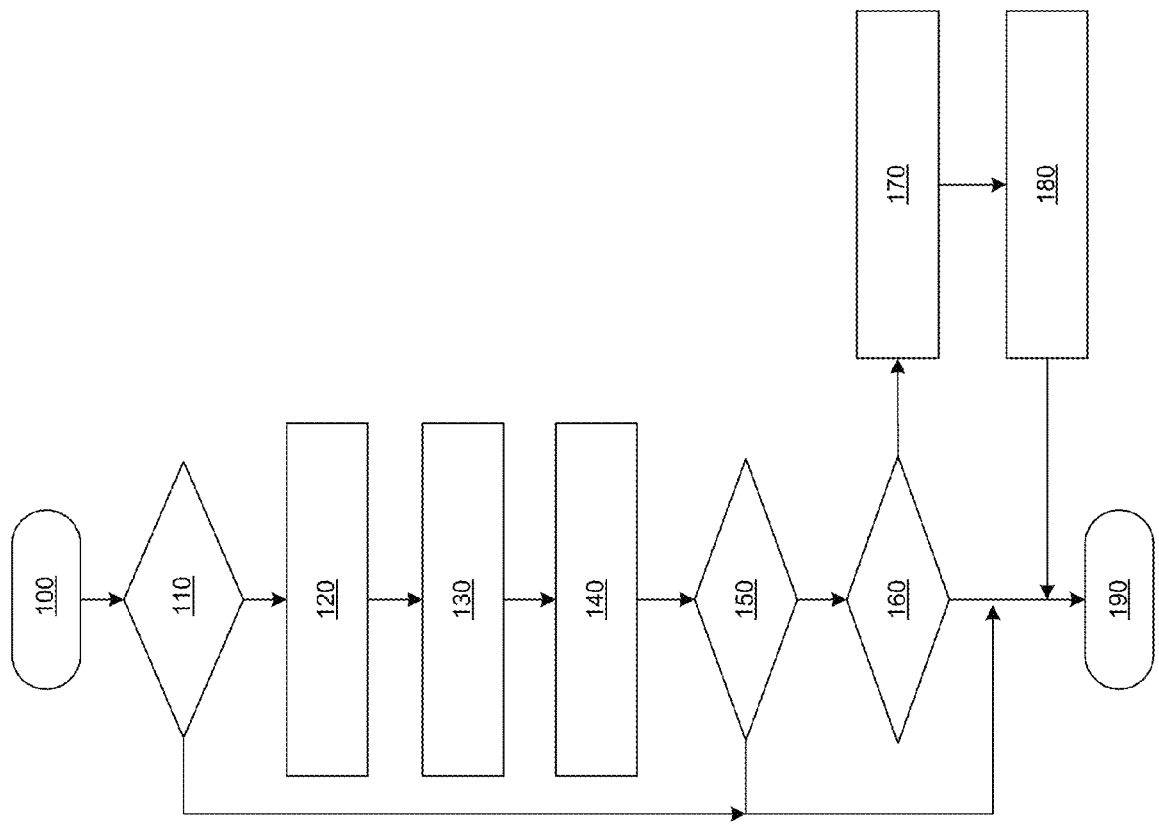

REGENERATION DIAGNOSTIC METHODS AND SYSTEMS

FIELD OF THE INVENTION

The subject invention relates to methods, systems and computer program products for monitoring regeneration of a particulate filter.

BACKGROUND

Exhaust gas emitted from an internal combustion engine is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

Exhaust gas emitted from an internal combustion engine, for example, a diesel engine, is a heterogeneous mixture that contains gaseous emissions such as carbon monoxide (CO), unburned hydrocarbons (HC) and oxides of nitrogen (NOx) as well as condensed phase materials (liquids and solids) that constitute particulate matter. Particulate filters are provided to filter the materials from the exhaust. When a particulate filter becomes full of particulates, the particulate filter is regenerated. If regeneration is performed too often, emissions can be affected.

Accordingly, it is desirable to provide methods and systems for monitoring the frequency of regeneration.

SUMMARY OF THE INVENTION

In one exemplary embodiment, a method of monitoring an exhaust treatment system of a vehicle is provided. The method includes: determining a modeled resistance of exhaust flow in the exhaust treatment system; determining a measured resistance of exhaust flow in the exhaust treatment system; evaluating the modeled resistance and the measured resistance to determine a fault status; and generating at least one of a warning signal and a message based on the fault status.

In another exemplary embodiment, a system for monitoring an exhaust treatment system of a vehicle is provided. The system includes a first module that determines a modeled resistance of exhaust flow in the exhaust treatment system. A second module determines a measured resistance of exhaust flow in the exhaust treatment system. A third module evaluates the modeled resistance and the measured resistance to determine a fault status. A fourth module generates at least one of a warning signal and a message based on the fault status.

In yet another exemplary embodiment, a vehicle is provided. The vehicle includes a particulate filter. A control module that determines a modeled resistance of the particulate filter, that determines a measured resistance of the particulate filter, that evaluates the modeled resistance and the measured resistance to determine a fault status, and that generates at least one of a warning signal and a message based on the fault status.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a flowchart illustrating an exhaust treatment monitoring method in accordance with exemplary embodiments.

DESCRIPTION OF THE EMBODIMENTS

Figure 1:
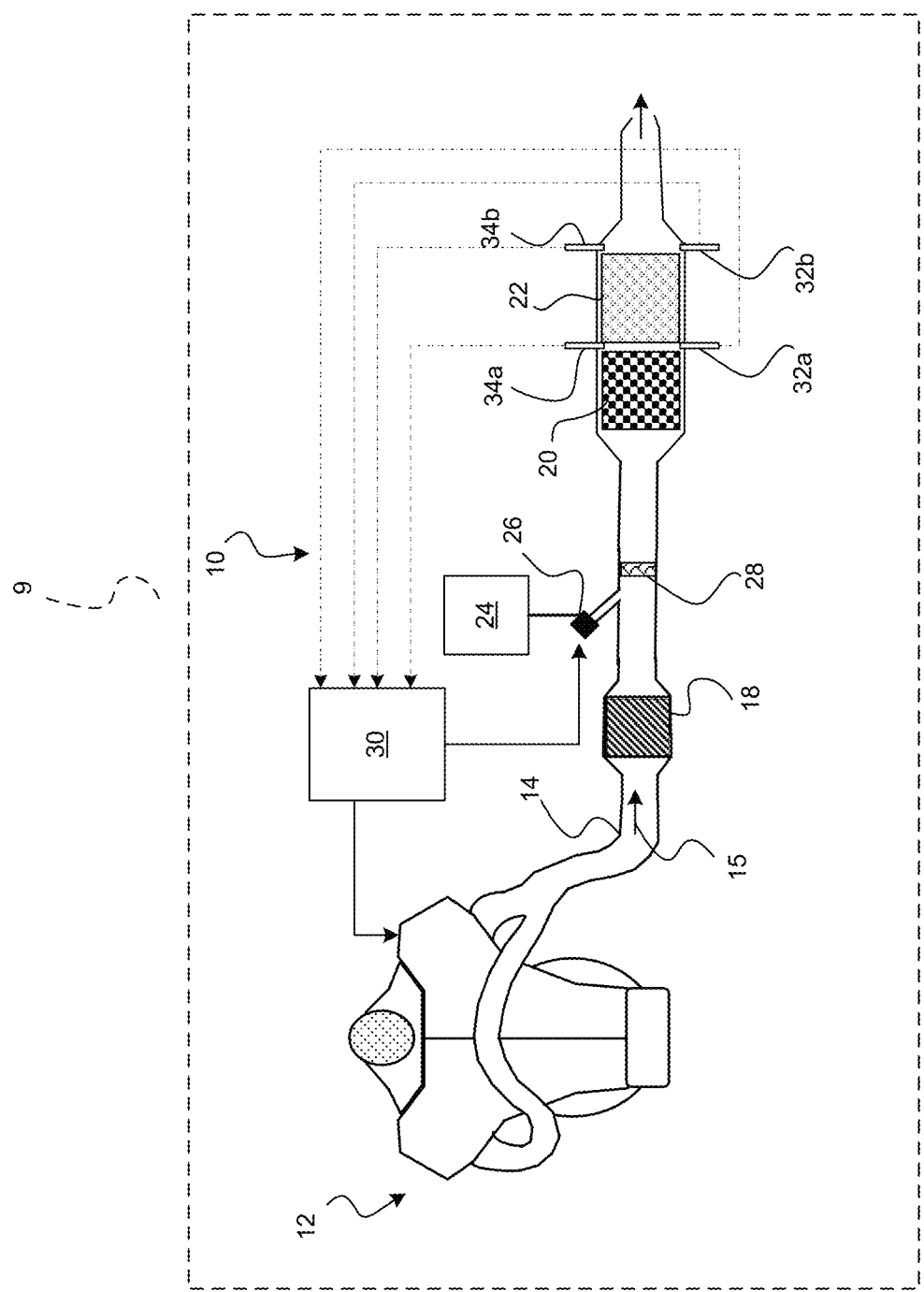
FIG. 1 is a functional block diagram of a vehicle that includes an exhaust treatment system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment of the invention is directed to a vehicle 9 that includes an exhaust gas treatment system 10, for the reduction of regulated exhaust gas constituents of an internal combustion engine 12. It is appreciated that the engine 12 is merely exemplary in nature and that the invention described herein can be implemented in various engine systems. Such engine systems may include, but are not limited to, diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust treatment devices include, for example, an oxidation catalyst (OC) 18, a selective catalytic reduction device (SCR) 20, and a particulate filter device (PF) 22. As can be appreciated, the exhaust gas treatment system 10 of the present disclosure may include the PF 22 and various combinations of one or more of the exhaust treatment devices shown in FIG. 1 (OC 18 and SCR 20), and/or other exhaust treatment devices (not shown), and is not limited to the present example.

In FIG. 1, the exhaust gas conduit 14, which may comprise several segments, transports exhaust gas 15 from the engine 12 to the various exhaust treatment devices of the exhaust treatment system 10. As can be appreciated, the OC 18 can be of various flow-through, oxidation catalysts known in the art. In various embodiments the OC 18 may include a flow-through metal or ceramic monolith substrate. The substrate may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 16 is useful in treating unburned gaseous and non-volatile HC and CO, which are oxidized to form carbon dioxide ($CO_2$) and water ($H_2O$).

The SCR 20 may be disposed downstream of the OC 18. The SCR 20 operates to reduce the oxides of nitrogen (NOx) in the exhaust gas 15. The SCR 20 may be constructed with a flow-through ceramic or metal monolith substrate. The substrate may be packaged in a rigid shell or canister having an inlet and an outlet in fluid communication with the exhaust gas conduit 14. The substrate may include a NOx reducing catalyst composition such as an SCR catalyst composition applied thereto. The SCR catalyst composition may include a zeolite and one or more base metal components such as iron (Fe), cobalt (Co), copper (Cu) or vanadium (V) that can operate efficiently to convert NOx constituents in the exhaust gas 15 in the presence of a reductant such as ammonia (NH3).

The reductant, such as NH3, may be supplied from a reductant supply source 24 and may be injected into the exhaust gas conduit 14 at a location upstream of the SCR using an injector 26, or other suitable method of delivery of the reductant to the exhaust gas 15. The reductant may be in the form of a gas, a liquid, or an aqueous urea solution and may be mixed with air in the injector 26 to aid in the dispersion of the injected spray. A mixer or turbulator 28 may also be disposed within the exhaust conduit 14 in close proximity to the injector 26 to further assist in thorough mixing of the reductant with the exhaust gas 15.

The PF 22 may likewise be disposed downstream of the OC 18. The PF 22 operates to filter the exhaust gas 15 of carbon and other particulates. As can be appreciated, the PF 22 can be of various particulate filters known in the art. In various embodiments, the PF 22 may be constructed using a wall flow monolith filter or other devices, such as, for example, wound or packed fiber filters, open cell foams, sintered metal fibers, etc. As shown in FIG. 1, the filter of the PF 22 may be packaged in the rigid shell or canister of the SCR 20. In various other embodiments, the PF 22 is packaged separately from the SCR 20.

A control module 30 controls the engine 12 and one or more components of the exhaust treatment system 10 based on sensed and/or modeled data. The sensed data can be received from various sensors that sense observable conditions of the exhaust treatment system 10. For example, temperature sensors 32a, 32b in various locations of the exhaust treatment system 10 sense a temperature of the exhaust gas 15 passing through the exhaust treatment system 10 and generate signals based thereon. In another example, pressure sensors 34a, 34b in various locations of the exhaust treatments system 10 sense a pressure of the exhaust gas 15 passing through the exhaust treatment system 10 and generate signals based thereon.

Generally speaking, the control module 30 receives the signals and evaluates whether regeneration of the PF 22 is too frequent. In various embodiments, the control module 30 evaluates whether regeneration is too frequent based on a predicted flow resistance and a measured flow resistance. If regeneration is too frequent, the control module can set a diagnostic code and can report the diagnostic code according to various reporting methods, including, but not limited to, using in-vehicle communication reporting messages and/or off-vehicle reporting messages.

Figure 2:
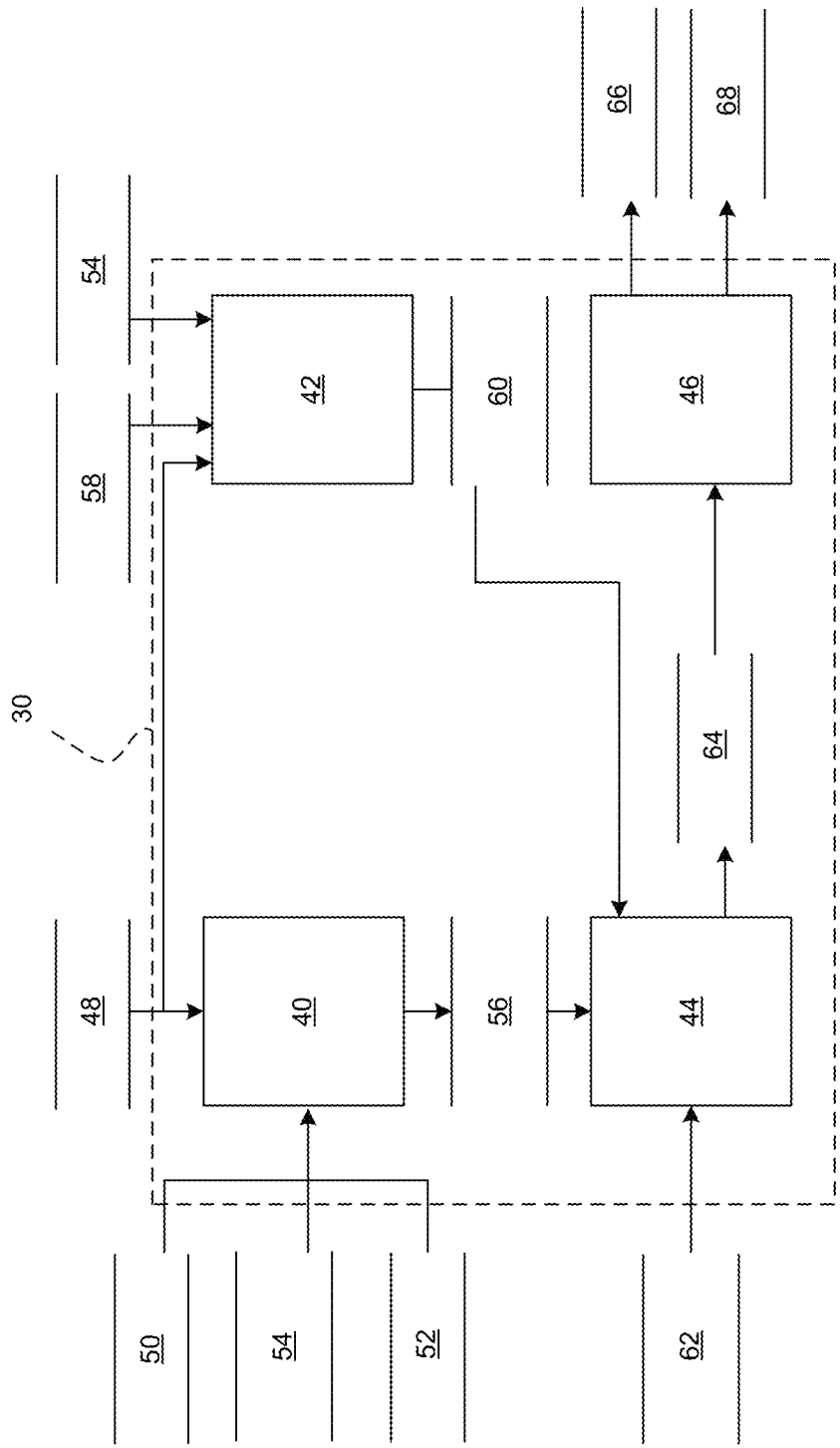
FIG. 2 is a dataflow diagram illustrating a control module that includes an exhaust treatment monitoring system in accordance with exemplary embodiments.

Referring now to FIG. 2, a dataflow diagram illustrates various embodiments of an exhaust control system that may be embedded within the control module 30. Various embodiments of exhaust control systems according to the present disclosure may include any number of sub-modules embedded within the control module 30. As can be appreciated, the sub-modules shown in FIG. 2 may be combined and/or further partitioned to similarly evaluate the frequency of regeneration. Inputs to the control module 30 may be sensed from the engine 12 (FIG. 1), received from other control modules (not shown), and/or determined/modeled by other sub-modules (not shown) within the control module 30. In various embodiments, the control module 30 includes a measured resistance determination module 40, a modeled resistance determination module 42, an evaluation module 44, and a reporting module 46.

The measured resistance determination module 40 receives as input a regeneration request 48, delta pressure 50, exhaust flow 52, and PF temperature 54. Based on the inputs, the measured resistance determination module 40 determines a measured resistance 56. For example, when the regeneration request 48 indicates that regeneration is desired, the measured resistance determination module 40 estimates the measured resistance 56 based on the delta pressure 50, the exhaust flow 52, and PF temperature 54. For example, the measured resistance determination module 40 converts the delta pressure ($\Delta P$) to a new delta pressure signal ($\Delta P'$) using linear transformation on $\Delta P$ and EF and then compensates with PF temperature:

$$\Delta P'=\text{Linear Transformation}(\Delta P, PFTemp, EF). \quad (1)$$

The measured resistance determination module then determines the measured resistance (Rmeasured) using a regression algorithm, such as, but not limited to, a Kalman filter, the exhaust flow (EF), and the delta pressure prime $\Delta P'$:

$$R\text{measured}=\text{Kalman Filter}(\Delta P', EF). \quad (2)$$

The modeled resistance determination module 42 receives as input the regeneration request 48, the PF temperature 54, and a predicted engine out particulate matter 58. In various embodiments, the engine out particulate matter can be a modeled value based on engine operating conditions.

Based on the inputs, the modeled resistance determination module determines a modeled resistance 60. For example, when the regeneration request 48 indicates that regeneration is desired, the modeled resistance determination module 42 determines the modeled resistance 60 (Rmeasured) as a function of the engine out particulate matter (PM) 58 and the PF temperature (PF Temp) 54:

$$R\text{modeled}=\text{Func}(PM, PFTemp). \quad (3)$$

In various embodiments, the modeled resistance determination module 42 includes a lookup table that is indexed by the predicted PM 58 and the PF temperature 54 and that is used to determine the modeled resistance 60.

The evaluation module 44 receives as input the measured resistance 56 and the modeled resistance 60. Based on the inputs, the evaluation module 44 sets a frequency regeneration fault status 64. For example, the evaluation module 44 determines a resistance ratio (R) based on the measured resistance (Rmeasured) 56 and the modeled resistance (Rmodeled) 60:

$$R=R\text{modeled}/R\text{measured}. \quad (4)$$

The evaluation module 44 then compares the resistance ratio (R) to a predetermined threshold. When the resistance ratio is less than the predetermined threshold, the evaluation module 44 sets the regeneration fault status 64 to FALSE. When the resistance ratio is greater than or equal to the predetermined threshold, the evaluation module 44 evaluates other conditions 62 that my have triggered the regeneration. Such conditions 62 may include, for example, but are not limited to, time since last regeneration, fuel consumed since last regeneration, and/or mileage accrued since last regeneration. If the other conditions 62 indicate that a regeneration is not needed (e.g., less than corresponding predetermined thresholds), then the evaluation module 44 sets the regeneration fault status 64 to TRUE (i.e., indicating that regeneration is too frequent). Otherwise, if the other conditions indicate that a regeneration is needed (e.g., greater than or equal to the corresponding predetermined thresholds), then the evaluation module 44 sets the regeneration fault status 64 to FALSE (i.e., indicating the regeneration is not too frequent).

The reporting module 46 receives as input the regeneration fault status 64. Based on the regeneration fault status 64, the reporting module 46 sets the value of a diagnostic code associated with the regeneration and reports the diagnostic code. In various embodiments, the diagnostic code can be reported by generating a message 66 on a serial data bus (not shown) of the vehicle 9 (FIG. 1), where the message 66 can be transmitted to a remote location using a telematics system (not shown) of the vehicle 9 (FIG. 1) or can be retrieved by a technician tool (not shown) connected to the vehicle 9 (FIG. 1).

In various embodiments, the reporting module 46 generates a warning signal 68 based on the diagnostic code. The warning signal 68 can be used to illuminate a warning light, sound a warning signal, and/or trigger a default operating of the engine 12 (FIG. 1) and/or the exhaust system 10 (FIG. 1).

Referring now to FIG. 3, and with continued reference to FIGS. 1 and 2, a flowchart illustrates an exhaust treatment monitoring method that can be performed by the control module of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the engine 12.

In one example, the method may begin at 100. It is determined whether PF regeneration is requested based on the regeneration request 48 at 110. If regeneration is requested at 110, the measured resistance 56 is determined, for example as discussed above, at 120. The modeled resistance 60 is determined, for example as discussed above, at 130.

The ratio of modeled resistance versus measured resistance is determined at 140 and evaluated at 150. If the ratio is less than a predetermined threshold at 150, the regeneration is not too frequent the fault status is set to FALSE at 160 and the method may end at 190. If, however, the ratio is greater than the predetermined threshold at 150, the time, fuel and/or mileage conditions 62 are evaluated at 160. If, the time, fuel, and/or mileage conditions 62 indicate that regeneration is needed (i.e., greater than predetermined thresholds), then regeneration is not too frequent, the fault status is set to FALSE at 160 and the method may end at 190.

If, however, the time fuel, and/or mileage conditions indicate that regeneration is not needed (i.e., less than predetermined thresholds), then regeneration is too frequent. The regeneration fault status is set to TRUE at 170, and the regeneration fault status is reported at 180 (e.g., by setting the diagnostic code and generating the message 66, and/or by generating the warning signal 68). Thereafter, the method may end at 190.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of monitoring an exhaust treatment system of a vehicle, comprising:
   monitoring regeneration of a particulate filter of the exhaust treatment system;
   determining, by a module comprising a processor, a modeled resistance of exhaust flow in the exhaust treatment system;
   determining a measured resistance of exhaust flow in the exhaust treatment system based on a regression algorithm that uses a plurality of values of a particulate filter temperature, an exhaust flow temperature and a delta pressure that are measured over a period of time;
   determining that the regeneration of the particulate filter does not occur more frequently than necessary in response to determining that a ratio of the modeled resistance to the measured resistance is not greater than a threshold ratio;
   evaluating a plurality of triggering conditions that trigger the regeneration of the particulate filter in response to determining that the ratio is greater than the threshold ratio;
   determining that the regeneration of the particulate filter occurs more frequently than necessary in response to determining that the plurality of triggering conditions indicate that a regeneration is not needed;
   determining that the regeneration of the particulate filter does not occur more frequently than necessary in response to determining that the plurality of triggering conditions indicate that a regeneration is needed; and
   generating at least one of a warning signal and a message based on whether the regeneration of the particulate filter occurs more frequently than necessary,
   wherein each of the modeled resistance and the measured resistance dynamically change such that the ratio is based on a dynamically changing measured resistance with respect to a dynamically changing modeled resistance.

2. The method of claim 1, wherein the regression algorithm includes a Kalman filter.

3. The method of claim 1, wherein the determining the measured resistance is performed before a regeneration of a particulate filter of the exhaust treatment system occurs.

4. The method of claim 1, wherein the determining the modeled resistance is based on a lookup table indexed by an estimated engine out particulate matter and a particulate filter temperature.

5. A system for monitoring an exhaust treatment system of a vehicle, comprising:
   a first module that monitors regeneration of a particulate filter of the exhaust treatment system and determines a modeled resistance of exhaust flow in the exhaust treatment system;
   a second module that determines a measured resistance of exhaust flow in the exhaust treatment system based on a regression algorithm that uses a plurality of values of a particulate filter temperature, an exhaust flow temperature and a delta pressure that are measured over a period of time;
   a third module that evaluates the modeled resistance and the measured resistance to determine a fault status that indicates whether the regeneration of particulate filter occurs more frequently than necessary in response to determining that a ratio of the modeled resistance to the measured resistance is not greater than a threshold ratio; and a fourth module generates at least one of a warning signal and a message based on the fault status, wherein each of the modeled resistance and the measured resistance dynamically change so as the ratio is based on a dynamically changing measured resistance with respect to a dynamically changing modeled resistance.

6. The system of claim 5, wherein the regression algorithm includes a Kalman filter.

7. The system of claim 5, wherein the second module determines the measured resistance before a regeneration of a particulate filter of the exhaust treatment system occurs.

8. The system of claim 5, wherein the first module determines the modeled resistance based on a lookup table indexed by an estimated engine out particulate matter and a particulate filter temperature.

9. A vehicle, comprising:
a particulate filter; and
a control module that monitors regeneration of the particulate filter, that determines a modeled resistance of the particulate filter, that determines a measured resistance of the particulate filter based on a regression algorithm that uses a plurality of values of a particulate filter temperature, an exhaust flow temperature and a delta pressure that are measured over a period of time, that evaluates the modeled resistance and the measured resistance to determine a fault status that indicates whether the regeneration of the particulate filter occurs more frequently than necessary in response to determining that a ratio of the modeled resistance to the measured resistance is not greater than a threshold ratio, and that generates at least one of a warning signal and a message based on the fault status, wherein each of the modeled resistance and the measured resistance dynamically change so as the ratio is based on a dynamically changing measured resistance with respect to a dynamically changing modeled resistance.

10. The vehicle of claim 9, wherein the regression algorithm includes a Kalman filter.

11. The vehicle of claim 9, wherein the control module determines the measured resistance before a regeneration of the particulate filter occurs.

12. The method of claim 1, wherein the plurality of triggering conditions comprise time since last regeneration, fuel consumed since last regeneration, and mileage accrued since last regeneration.

* * * * *